United States Patent [19]

Gurwicz et al.

[11] 4,227,243

[45] Oct. 7, 1980

[54] CONVERTERS

[75] Inventors: David Gurwicz, Gateshead; Keith Pacey, Sale, both of England

[73] Assignee: Chloride Group Limited, London, England

[21] Appl. No.: 918,096

[22] Filed: Jun. 22, 1978

[30] Foreign Application Priority Data

May 30, 1978 [GB] United Kingdom ............... 26680/77

[51] Int. Cl.² ........................................... H02M 7/537
[52] U.S. Cl. ...................................... 363/132; 363/98
[58] Field of Search .................................. 363/95–98, 363/131–132, 135–139, 22–25, 78

[56] References Cited

U.S. PATENT DOCUMENTS

| | | | |
|---|---|---|---|
| 3,315,144 | 4/1967 | Poss | 363/96 |
| 3,406,330 | 10/1968 | Pelly | 363/96 |
| 3,465,233 | 9/1969 | Johnston et al. | 363/136 X |
| 3,697,855 | 10/1972 | Kernick et al. | 363/56 X |
| 3,750,003 | 7/1973 | Peterson et al. | 363/56 |
| 3,842,339 | 10/1974 | Hoffman | 363/136 |

Primary Examiner—J. D. Miller
Assistant Examiner—Peter S. Wong
Attorney, Agent, or Firm—Oblon, Fisher, Spivak, McClelland & Maier

[57] ABSTRACT

A converter includes a resonant oscillatory tank circuit comprising a capacitor and an inductor, at least one switching circuit including a solid state switching device in parallel with a diode connected to apply a predetermined potential difference from a DV supply to the inductor, and synchronizing means responsive to the oscillation of the oscillatory circuit for switching on the switching means for a fraction of a cycle when the instantaneous value of the oscillatory potential difference across the inductor is already not less than a predetermined value, to delay the fall of the said oscillating potential difference and inject energy from the supply into the oscillatory circuit, and a load circuit coupled or connected to the tank circuit in series with the inductor.

11 Claims, 6 Drawing Figures

CONVERTERS

This invention relates to converters. The invention is particularly applicable, although not limited, to high-frequency convertors incorporated in electric battery charging apparatus supplied from a mains supply. In the usual form of charger if a step down or step up of voltage is required a transformer is necessary and even where there is no change of voltage a transformer will generally be required to ensure isolation of the battery from direct connection to the mains supply. In the case of a high-power charger the weight and bulk of a transformer for mains frequency will be very substantial, but if the frequency involved is increased to some kiloherz, for example 25 KHz, the weight and bulk are greatly reduced. In the case of a battery-driven vehicle this may make it practicable to carry the charger on the vehicle.

The present invention is a development of the invention set forth in a companion U.S. patent application No. 918,023 filed June 27, 1978, Case EPS 287A, in the name of one of the present applicants.

That specification describes a converter including a resonant oscillatory tank circuit comprising a capacitor and an inductor, a switching circuit including a solid state switching device connected to apply a predetermined potential difference from a DV supply to the inductor, and synchronising means responsive to the oscillation of the oscillatory circuit for switching on the switching means for a fraction of a cycle only when the instantaneous value of the oscillatory potential difference across the inductor is already not less than a predetermined value, to delay the fall of the said oscillating potential difference and inject energy from the supply into the oscillatory circuit.

An object of that invention was to provide a converter having a more nearly sinusoidal output than had hitherto been available.

A further object of the present invention is to provide a converter whereof the output can be effectively controlled without imposing unnecessarily arduous duty on components such as switching devices.

The present invention is characterised in that the load circuit is connected or coupled to the tank circuit in series with the inductor, for example it may be connected to a secondary winding of a transformer having a primary winding in series with the inductor of the tank circuit.

The switching circuit may include a solid state switching device in parallel with a diode.

In one form of the invention, the tank circuit comprises an inductor connected in series with a capacitor across the DV supply and the switching circuit is connected in paralled with the capacitor.

In another form of the invention, of push pull form, the converter includes a pair of supply capacitors connected in series with each other across the DV supply, and a pair of switching circuits each comprising a solid state switching device in parallel with a diode, also connected in series with each other across the supply, and the inductor of the tank circuit is connected between the junction of the supply capacitors and the junction of the switching circuits.

The capacitor of the tank circuit may be connected between the junction of the switching circuits and one or each supply terminal, or it may be connected in parallel with the inductor.

The capacitor of the tank circuit may be shunted by a resistor, and may be connected in series with a solid state switching device for starting oscillation.

The invention also embraces a battery charger incorporating the converter in combination with a rectifier to supply it from AC mains, a high-frequency transformer, and a rectifier for supplying unidirectional charging current.

Further features and details of the invention will be apparent from the following description of one specific embodiment that will be given by way of example with reference to the accompanying drawings in which:-

The companion specification referred to above describes inter alia a converter circuit including a pair of supply capacitors C1 and C2 connected in series between DV supply terminals 11 and 10, a pair of switching circuits each comprising a transistor T1 or T2 in series with a diode D1 or D2 also connected in series with each other across the same DV supply terminals and a resonant oscillatory tank circuit including a tank capacitor C3 effectively in parallel with an inductor L1 connected between the junction of the supply capacitors and the junction A of the switching circuits. A load RL is coupled or connected in parallel with the inductor.

Figure 1:
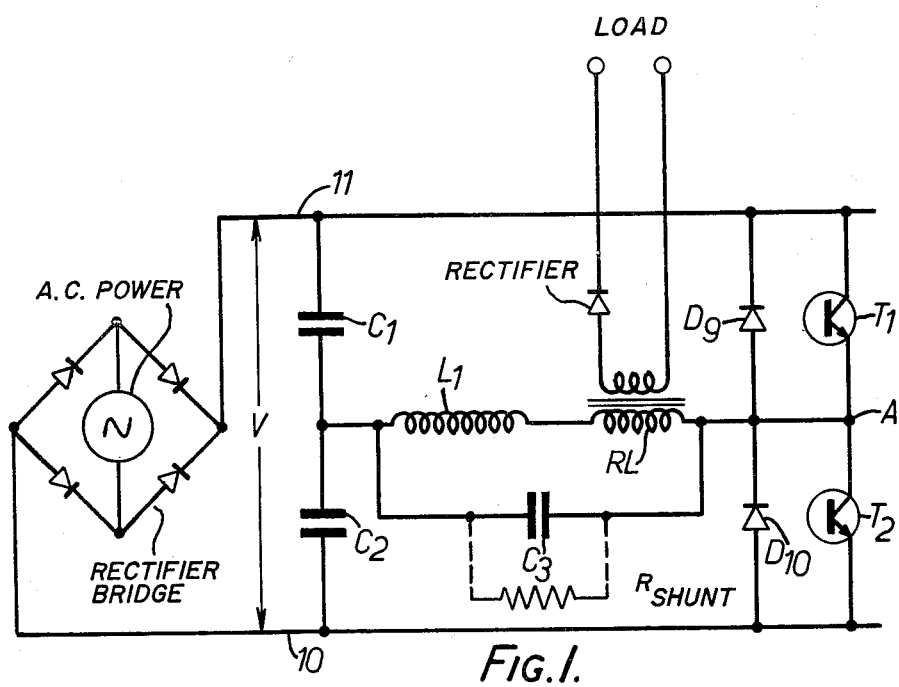
FIG. 1 is a schematic circuit diagram of one embodiment of the invention.

The embodiment of the present invention shown in FIG. 1 is similar to that described, (and like parts bear the reference symbols quoted) except that the load RL is connected in series with the inductor L1, and the series diode D1 or D2 of each switching circuit is replaced by a diode D9 or D10 in parallel with the respective transistor T1 or T2.

For a charger the supply terminals 10 and 11 may be the output of a rectifier having its input connected to an AC mains supply which the load RL comprises a transformer connected to the input of a further rectifier having its output connected to battery terminals.

In the arrangements specifically described in the companion application, with the load in parallel with the inductor of the tank circuit, control is effected by increasing or decreasing the amplitude of the tank oscillations. In the case where the load is a battery the amplitude must vary in response to the state of charge of the battery and thus its terminal voltage. Permitting the voltage to rise above the positive rail or fall below the negative achieves this objective. This implies the use of switching devices rated to withstand voltages considerably in excess of the supply.

In the circuit shown in FIG. 1 of the present application totally different considerations apply. The voltage excursion of the point A is constrained to the supply rails by the diodes D9 and D10, with the load RL (illustrated by a transformer) connected in series with the inductor of the tank circuit. The tank capacitor C3 is connected in parallel with the combination.

Figure 2:
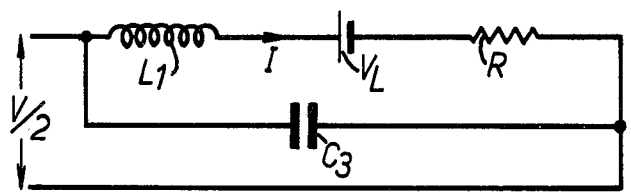
FIGS. 2 and 3 are equivalent circuit diagrams illustrating the operation of the arrangement of FIG. 1 in different portions of a cycle.

FIG. 2 shows the equivalent circuit during the conduction of one or other of the switching transistors when used for charging a battery the load voltage shown as VL is of course the reflected voltage appearing across the transformer primary of the actual battery connected across the rectified secondary output. R denotes the system resistance which can be ignored.

Figure 3:
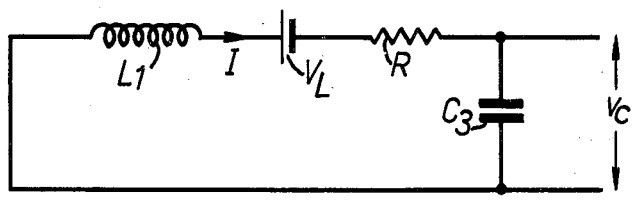

FIG. 3 shows the equivalent circuit during the non conduction periods of the switching transistors.

Figure 4:
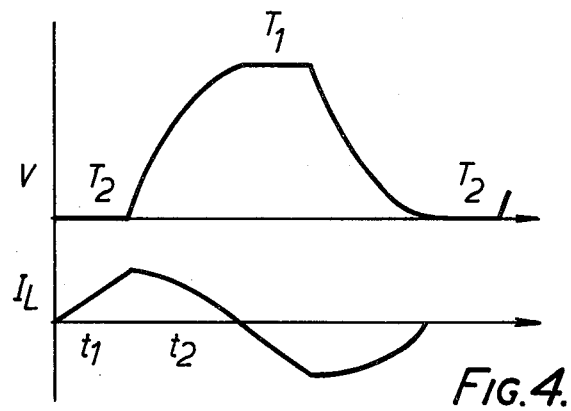
FIGS. 4 and 5 are wave form diagrams illustrating the operation of the arrangement.
Figure 5:
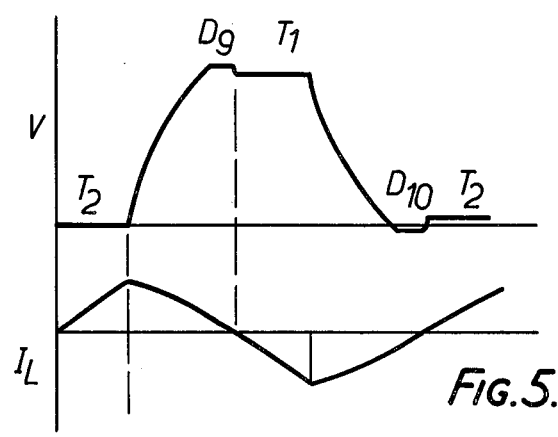

Thus with the transistor T2 conducting, the current IL in the inductor L1 rises linearly at a rate determined by the difference between V/2 and the reflected load voltage and the circuit constants. After a given time transistor conduction is terminated and the potential of the point A rises sinusoidally towards the positive supply line. It will be assumed that sufficient energy has been supplied during the conduction of one device to ensure that the point A attains the potential of the opposite rail when or before the current in the tank circuit falls to zero. If zero, the second device conducts immediately the point A attains the rail potential, if not, current is initially passed back to the supply via the parallel diode, the transistor then turns on. Load current, i.e. tank current, can be controlled by varying the conduction time of the switching devices. FIG. 4 illustrates the voltage and current waveforms for zero tank currents at reversal, FIG. 5 shows the same waveforms for non-zero condition.

Figure 6:
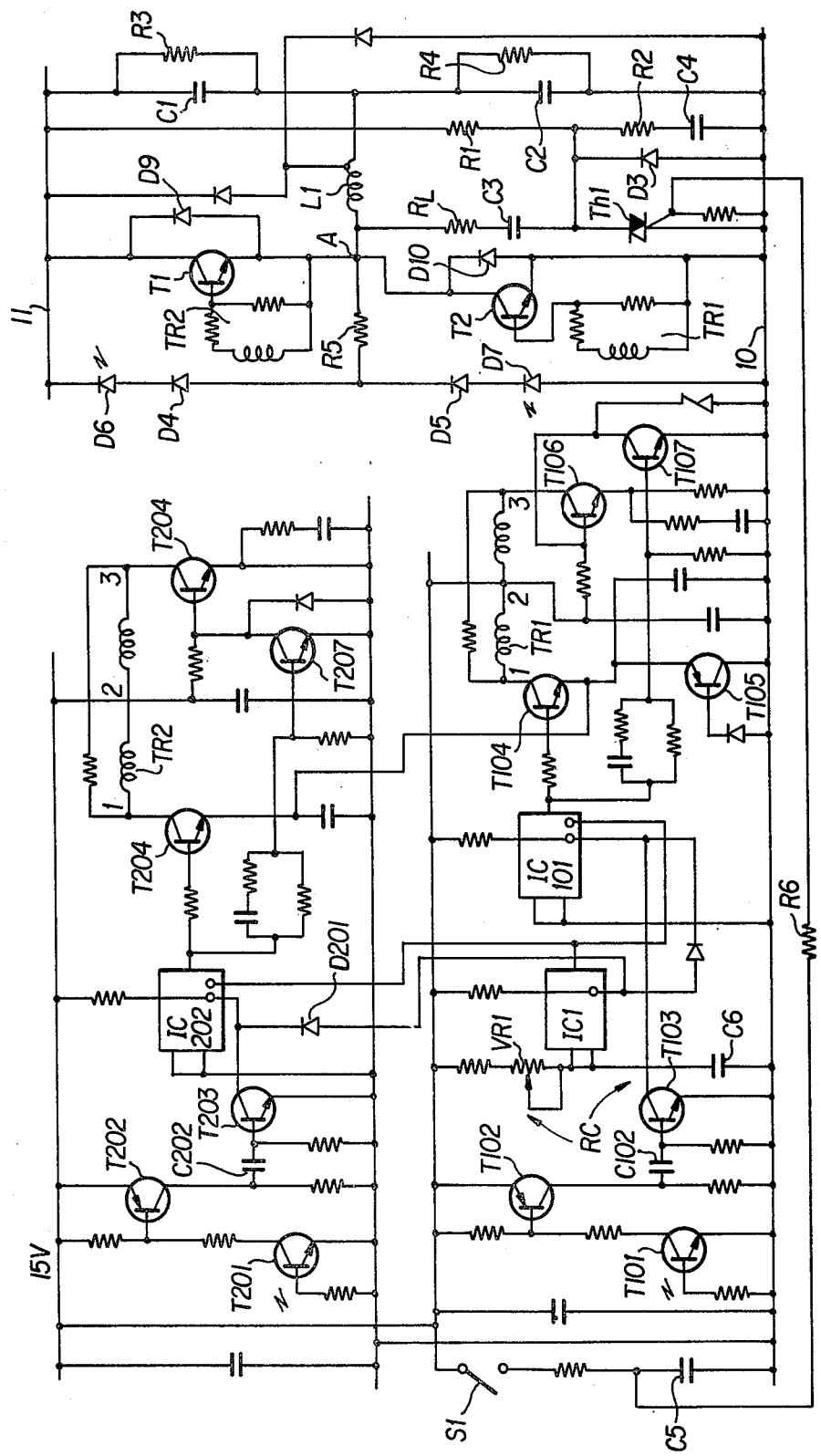
FIG. 6 is a more detailed circuit diagram of the circuit of FIG. 1.

Further details of the arrangement such as the firing circuits for controlling the transitors, and their operation, may be of known type or analogous to those described in the companion application referred to above. FIG. 6 shows an arrangement similar to that of FIG. 1 in greater detail. Thus the capacitors C1 and C2 will be seen on the right of the figure connected in series across the power supply terminals 11 and 10. Similarly, the transistors T1 and T2 each in parallel with a diode D9 or D10 will be seen connected in series with each other across the same pair of terminals, whilst the junction between the transistors and the junction between the capacitors are connected through the inductor L1 which is in series with load RL which, as indicated above, may be a primary winding of a transformer or a winding inductively coupled to the inductor L1.

The capacitors C1 and C2 share the supply voltage, resistors R3 and R4 serving to compensate for unequal leakage currents, so that the potential at the junction of C1 and C2 with respect to the earthed terminal 10 is half the potential at the terminal 11. The inductor L1 and a capacitor C3 form a tuned tank circuit. Power is fed into the "tank" circuit by the alternate conduction of the tansistors T1 and T2.

It is believed that the remainder of the circuit will be clear from the diagram, taken with the following description of its operation.

Starting is achieved by firing a Thyristor Th1. As described below a logic system on the left of the diagram senses the potenital at the point A; if this is negative with respect to the line 10 the drive circuit to the transistor T2 is initiated, whereas if the point A is positive with respect to the line 11 the drive circuit to the transistor T1 is initiated. Initially a switch S1 is open, the thyristor Th1 non-conducting, and the capacitor C3 charges via a resistor R1 and the inductor L1 so that its bottom plate is positive with respect to the point A. A capacitor C4 also charges via resistors R1 and R2. Closing the switch S1 (which may be effected manually or electronically) fires the thyristor Th1 which "grounds" the bottom plate of the capacitor C3; the capacitor C4 provides latching current for the thyristor Th1. The point A is thus driven negative with respect to ground, initiating the drive to transistor T2. Thereafter, the thyristor Th1 remains in conduction, reverse currents being bypassed by a diode D3.

Clamping diodes D8 and D9 are included in FIG. 6 as are diodes D9 and D10 in FIG. 5 to limit the voltage appearing across the transistors T1 and T2 during initiation of circuit oscillations and in the event of an open-circuit appearing on the output of the converter.

Considering now the logic system, two identical circuits are employed providing the drive to each of the transistors T1 and T2 in turn. When the point A falls below the potential of the negative line 10, current flows via a resistor R5, a diode D5, and a light emitting diode D7. When the point A rises above the potential of the positive line 11, current flows via the resistor R5, a diode D4, and a light emitting diode D6. The L.E.D.'s form part of opto-isolators, the diode D7 being associated with a transistor T101 and the diode D6 with a transistor T201.

Conduction of the transistor T101 turns on a transistor T102, the output of which is differentiated by a capacitor C102 into the base of a transistor T103. The resultant negative going pulse at the collector passes through a diode D102 to trigger an integrated circuit IC1 cooperating with a resistor VR, and a capacitor C6 to form a timer of which the timing period now commences. Simultaneously with the triggering of the timer, a further integrated circuit IC101 here connected as a flip-flop is triggered by the pulse from the collector of the transistor T103. The output of the integrated circuit IC1 "going high" removes the reset signal, triggering being therefore effected directly by the transistor T103. The output of the integrated circuit IC101 "going high" turns on a transistor T104 energizing a primary winding of a transformer TR1 which provides base drive to the transistor T2. With the circuit IC101 high, a transistor T107 is held on, removing the base drive of a transistor T106.

At the end of the timing period of the timer IC1, its output "goes low", resetting the integrated circuit IC101 removing the base drive to the transistors T104 and T107. The transistor T106 thus "turns on", energizing a second primary winding of the transformer TR1 and applying reverse base drive to T2, turning it off.

The circuit associated with the drive to the transistor T1 performs in an identical manner being initiated by the opto-isolator consisting of the doide D6 and transistor T201 (other corresponding components bearing numbers 200 odd instead of 100 odd). It should be noted that common timing components, i.e. VR1,R7,C6, and IC1 are used for both circuits.

It should further be noted that the timing periods commence when the potential of the point A becomes more positive than the positive line 11 or more negative than the negative line 10, but due to the diodes D5 and D6 power can only be transferred from the supply to the tank circuit when this potential again has passed through that of the said line and the respective transistor and diode become forward biased. Thus the circuit is to a large degree self-regulating under conditions of constant load and supply voltage. Any increase in the amplitude of oscillation will reduce the conduction period and hence energy transfer and vica versa.

The power output can be varied by adjustment of the variable resistor VR1 to vary the resistance of the resistor capacitor time IC1.

What we claim as our invention and desire to secure by Letters Patent is:

1. A DC-AC converter of push-pull form comprising:

a direct current (D.C.) input supply having terminals providing a D.C. supply voltage;

a load circuit including a transformer;

an oscillatory circuit including at least one capacitor and an inductor connected to a primary winding of the load transformer;

a solid-state switching circuit including at least one switching device connected in series with said inductor across said D.C. terminals; and means for synchronizing the operation of the switching circuit to the oscillation of the oscillatory circuit, said synchronizing means rendering said switching circuit non-conductive to allow the oscillatory circuit to oscillate freely for part of a cycle to transfer energy from the inductor to the capacitor to charge the latter to a certain condition in which the voltage across the inductor is substantial relative to that across one of said switching devices, which then has negligible voltage thereacross, and only then actuate said one switching device to a conductive state to connect the inductor across half of the D.C. supply whereupon the inductor receives and stores energy from said supply;

wherein said load circuit is coupled to the oscillatory circuit in series with said inductor.

2. A converter as claimed in claim 1 in which the load circuit transformer comprises a secondary winding coupled to a load and a primary winding in series with the inductor of the oscillatory circuit.

3. A converter as claimed in claim 1 in which the switching circuit includes a solid state switching device in parallel with a diode.

4. A converter as claimed in claim 1 of push pull form which includes a pair of supply capacitors connected in series with each other across the DC supply, and a pair of switching circuits each comprising a solid state switching device in parallel with a diode, also connected in series with each other across the supply, and in which the inductor of the oscillatory circuit is connected between the junction of the supply capacitors and the junction of the switching circuits.

5. A converter as claimed in claim 4 in which the capacitor of the oscillatory circuit is connected between the junction of the switching circuits and one or each supply terminal.

6. A converter as claimed in claim 4 in which the capacitor of the oscillatory circuit is connected in parallel with the inductor.

7. A converter as claimed in claim 4 in which the capacitor of the tank circuit is shunted by a resistor.

8. A converter as claimed in claims 4, 5, 6, or 7 in which the capacitor of the oscillatory circuit is connected in series with a solid state switching device for starting oscillation.

9. A converter as claimed in claim 1 in which the frequency of the oscillatory circuit is at least 1 KHz.

10. A converter as claimed in claim 9 in which the frequency of the oscillatory circuit is of the order of 25 KHz.

11. A battery charger incorporating a converter as claimed in claims 2 or 3 in combination with a rectifier to supply it from A.C. mains, a high-frequency transformer and a rectifier for supplying unidirectional charging current.

* * * * *